Patented Dec. 1, 1953

2,661,371

UNITED STATES PATENT OFFICE 2,661,371

PURIFICATION OF TYROSINE

Basil B. Dowling, Skokie, Ill., assignor to International Minerals & Chemical Corporation, a corporation of New York No Drawing. Application June 3, 1952,
Serial No. 291,576

4 Claims. (Cl. 260—519)

The present invention relates to a process for the recovery of tyrosine from protein hydrolysates. More particularly, it relates to a process for the extraction and purification of tyrosine from a tyrosine-containing mixture recovered from protein hydrolysates.

Recent pharmaceutical interest in pure tyrosine in commercial quantities has resulted in an endeavor to discover improved and commercially acceptable methods for the recovery of tyrosine from raw materials containing it, such as protein hydrolysates.

In the conventional processing of protein hydrolysates, a mixture containing tyrosine, leucine, cystine, isoleucine and other amino acids and inorganic salts is separated from the hydrolysate. This mixture is referred to as tyrosine-leucine cake. The content of the constituents of this cake on a dry basis varies, but generally the mixture contains between about 5% and about 13% tyrosine. Tyrosine, leucine and cystine are the three most water-insoluble acids present in the tyrosine-leucine cake at the pH's at which the tyrosine-leucine cake is conventionally removed. In producing substantially pure tyrosine it has proved especially difficult to completely separate cystine from tyrosine.

It is an object of the instant invention to provide an improved process for the recovery of tyrosine from mixtures containing the same and other water-insoluble amino acids.

It is a further object of the instant invention to provide a process for the separation of tyrosine from other relatively water-insoluble amino acids which are generally present in crude tyrosine-containing mixtures separated from protein hydrolysates.

It is a further object of the instant invention to provide a process for the purification of tyrosine resulting in a product which is substantially free from cystine.

It is a further object of the instant invention to provide a process for the recovery of substantially pure tyrosine from protein hydrolysates.

These and other objects of the instant invention will become apparent upon a fuller understanding of the invention as hereinafter set forth.

It has been found that tyrosine can be recovered from mixtures containing principally tyrosine, leucine, isoleucine, cystine and inorganic salts by treatment with an aqueous solution. In the general method employed in practicing the instant novel process, tyrosine is recovered from a crude tyrosine, leucine, cystine-containing cake which has been separated from a protein hydrolysate in any conventional manner, by admixing the tyrosine-leucine cake with sufficient water to dissolve substantially all of the tyrosine present in the tyrosine-leucine cake. Tyrosine-leucine cakes can be separated from the hydrolysate of any proteinaceous material, such as, wheat gluten, corn gluten, albumin, soybean meal, cottonseed meal, peanut meal, casein, linseed meal, flaxseed meal and similar proteinaceous materials. It has been found that the volume of water necessary to dissolve all of the tyrosine at about 100° C. is approximately equal to the volume of water required to keep the other amino acids in solution at about 25° C. The tyrosine-leucine cake is admixed with sufficient water to substantially completely dissolve tyrosine at an elevated temperature such as between about 60° C. and about 100° C., preferably at a temperature between about 80° C. and about 100° C. A temperature near the boiling point of the solution is preferred, because at lower temperatures, larger volumes of water must be used to substantially completely dissolve the tyrosine. However, temperatures lower than about the boiling point may be employed if a larger amount of water is employed. Solid material is separated from the hot solution. The hot solution from which solids have been separated is cooled, and tyrosine is crystallized therefrom.

In another embodiment of the instant novel process, activated carbon is added to the tyrosine-leucine-hot water mixture in order to remove pigment-containing material and other impurities, and the carbon is removed from the hot solution by any convenient method, such as by filtration. The hot solution is cooled and crude tyrosine is allowed to crystallize from the cooled filtrate and is separated. This crude tyrosine is treated again with water in the same manner as above described, in order to produce pure white tyrosine.

In a specific embodiment of the instant invention hydrochloric acid-hydrolyzed cereal gluten is filtered in order to separate the humin from the hydrolysate, and a tyrosine-leucine cake containing tyrosine, leucine, isoleucine, cystine, other amino acids and inorganic salts is crystallized from the resulting solution from which humin has been removed, and is separated, for example by filtration. About 100 grams of the tyrosine-leucine cake which contains about 9 grams of tyrosine are dissolved in between about 1500 and about 1600 milliliters of water at a temperature between about 90° C. and about 95° C. Between about 5 and about 15 grams of activated carbon is contacted with the hot solution. After the mixture has been heated at between about 90° C. and about 95° C. for at least about thirty minutes, preferably between about one-half and about one hour, the carbon is removed from the solution by any convenient method, such as by filtration. The resulting solution is cooled to room temperature and allowed to stand for between about four and about twenty-four hours, preferably for about eight hours. Tyrosine crystallizes from the solution. The crude tyrosine is separated from the solution, for example by filtration and is washed. This crude tyrosine mixture contains between about 75% and about 85% tyrosine.

This crude tyrosine is further purified by dissolving the crude tyrosine in between about 1400 and about 1500 milliliters of water at between about 90° C. and about 95° C. The hot solution is contacted with decolorizing carbon for at least about thirty minutes at a temperature between about 90° C. and about 95° C., and the carbon is separated from the resulting mixture by any convenient method, such as by filtration. The tyrosine is allowed to crystallize from the cooled filtrate for a period between about four and about twenty-four hours, tyrosine is separated from the mixture, washed, and dried. The tyrosine separated is at least about 99% purity and is white in color. It is substantially free from cystine.

In a preferred embodiment of the instant invention the tyrosine-leucine cake is admixed with sufficient hot aqueous filtrate, recycled from a previous purification of crude tyrosine, as previously described, to substantially completely dissolve the tyrosine present in the cake. Recycling the filtrate results in increased recoveries of tyrosine. When the filtrate from which pure tyrosine has been crystallized is recycled, the tyrosine recovered does not decrease in purity. There is no build-up of impurities because fresh water is used for each purification of the crude tyrosine. Filterability of the hot tyrosine-containing solution is facilitated by the addition of a filter aid to the solution. When filter aid is employed, generally, between about 2% and about 10% of filter aid by weight of the tyrosine-leucine cake is sufficient to promote easy filtration.

The use of activated carbon exerts an important influence on yields and purity obtainable in the instant novel process. The tyrosine-leucine cakes contain an impurity which inhibits crystallization of tyrosine. The use of between about 5% and about 15% by weight of activated carbon, preferably about 10% by weight of the tyrosine-leucine cake, increases tyrosine recovery. The carbon cake from the crude purification as well as the filtrate can be recycled to the next batch of tyrosine-leucine cake.

The following example is presented in order to afford a clearer understanding of the practice of the instant invention, but it is to be distinctly understood that this example is illustrative only and that there is no intention to limit the invention thereto.

*Example*

To about 1000 pounds (dry basis) tyrosine-leucine cake, which has been separated from a wheat gluten hydrolysate and contains about 95 pounds of tyrosine, was added about 1920 gallons of water at a temperature of between about 90° C. and about 95° C. The resulting slurry was stirred for about thirty minutes at between about 90° C. and about 95° C. Decolorizing carbon (Darco KB) was added to the hot solution and the solution was held at a temperature between about 90° C. and about 95° C. for an additional thirty minutes or more. Carbon was removed from the solution by filtration. The filtrate was allowed to cool, and tyrosine crystallized from the filtrate over a period of between about sixteen and about twenty hours. A crude tyrosine cake was separated from the filtrate. This cake was dissolved in about 1800 gallons of water at a temperature between about 90° C. and about 95° C. About 100 pounds of carbon was added to the solution, and the resulting slurry was maintained at a temperature between about 90° C. and about 95° C. for about thirty minutes. Carbon was removed from the hot solution by filtration. The resulting filtrate was cooled, and tyrosine was allowed to crystallize from the solution over a period of between about sixteen and about twenty hours. Pure tyrosine was separated from the mixture. About 75 pounds of pure tyrosine was recovered, which constituted a yield of about 80%. The filtrate and the decolorized carbon were recycled for use in the treatment of additional quantities of tyrosine-leucine cake.

Having thus fully described and illustrated the character of the invention, what is desired to be secured and claimed by Letters Patent is:

1. A process for the recovery of tyrosine from tyrosine - leucine - cystine containing mixtures which comprises admixing a tyrosine-leucine-cystine mixture with sufficient liquid selected from the group consisting of water and mother liquor from a subsequent tyrosine crystallization step at a temperature between about 60° C. and about 100° C. to substantially completely dissolve the tyrosine from said mixture, contacting the hot solution with activated carbon for at least about thirty minutes, separating solid material from the hot solution, cooling the resulting solution to about atmospheric temperature, and crystallizing and recovering tyrosine therefrom.

2. A process for the recovery of tyrosine from tyrosine - leucine - cystine containing mixtures which comprises admixing a tyrosine-leucine-cystine mixture with sufficient liquid selected from the group consisting of water and mother liquor from a subsequent tyrosine crystallization step at a temperature between about 60° C. and about 100° C. to substantially completely dissolve the tyrosine from the said mixture, separating solid material from the resulting hot solution, cooling the resulting solution, separating the crude tyrosine which precipitates from the cooled solution, dissolving the crude tyrosine in sufficient aqueous solution to substantially completely dissolve the tyrosine at a temperature between about 60° C. and about 100° C., separating solid material from the hot solution, cooling the resulting solution, allowing tyrosine to crystallize therefrom, and recovering the tyrosine crystals.

3. A process for the recovery of tyrosine from tyrosine - leucine - cystine containing mixtures which comprises admixing a tyrosine-leucine-cystine mixture with sufficient liquid selected from the group consisting of water and mother liquor from a subsequent tyrosine crystallization step at a temperature between about 60° C. and about 100° C. to substantially completely dissolve the tyrosine from said mixture, contacting the hot solution with activated carbon, separating solid material from the decolorized solution, cooling the resulting solution to about atmospheric temperature, separating the crude tyrosine that crystallizes from the solution, dissolving the crude tyrosine in sufficient aqueous solution to substantially completely dissolve tyrosine at a temperature between about 60° C. and about 100° C., contacting the resulting hot solution with activated carbon, separating solid material from the hot solution, cooling the resulting solution to about atmospheric temperature, separating substantially pure tyrosine which precipitates therefrom, and employing the liquor from which the tyrosine crystals have been last separated as the aqueous solution in which the tyrosine-leucine-cystine mixture is initially dissolved.

4. A process for the recovery of tyrosine from tyrosine - leucine - cystine containing mixtures which comprises admixing a tyrosine-leucine-cystine mixture with sufficient liquid selected from the group consisting of water and mother liquor from a subsequent tyrosine crystallization step at a temperature between about 60° C. and about 100° C. to substantially completely dissolve the tyrosine from said mixture, separating solid material from the hot solution, cooling the resulting solution to about atmospheric temperature, and crystallizing and recovering tyrosine therefrom.

BASIL B. DOWLING.

References Cited in the file of this patent

UNITED STATES PATENTS

| Number | Name | Date |
| --- | --- | --- |
| 2,009,868 | Barnett | July 30, 1935 |
| 2,178,210 | Mark | Oct. 31, 1939 |
| 2,376,186 | Rapkine | May 15, 1945 |
| 2,471,053 | Almquist et al. | May 24, 1949 |

FOREIGN PATENTS

| Number | Country | Date |
| --- | --- | --- |
| 856,379 | France | Mar. 18, 1940 |

OTHER REFERENCES

Plimmer: Biochem. J., vol. 7, pp. 311–317 (1914).

Plimmer: Chem. Abstracts, vol. 8, p. 1798 (1914).

Susuki: Chem. Abstracts, vol. 11, p. 2391 (1924).

Sano: Chem. Abstracts, vol. 20, p. 1820 (1926).

Greenbaum: Chem. Abstracts, vol. 29, p. 6262 (1935).

Zachary et al.: J. Biol. Chem., vol. 177, pp. 715–716 (1949).

Block et al.: "Amino Acid Composition of Proteins and Foods," p. 85 (1947).

Handbook of Chem. and Physics, Chem. Rubber Co., 26th ed., pp. 730–1 (1942).